June 21, 1960
A. R. PEZZILLO
2,941,476
MOTOR PUMP UNITS
Filed June 23, 1955
5 Sheets-Sheet 1
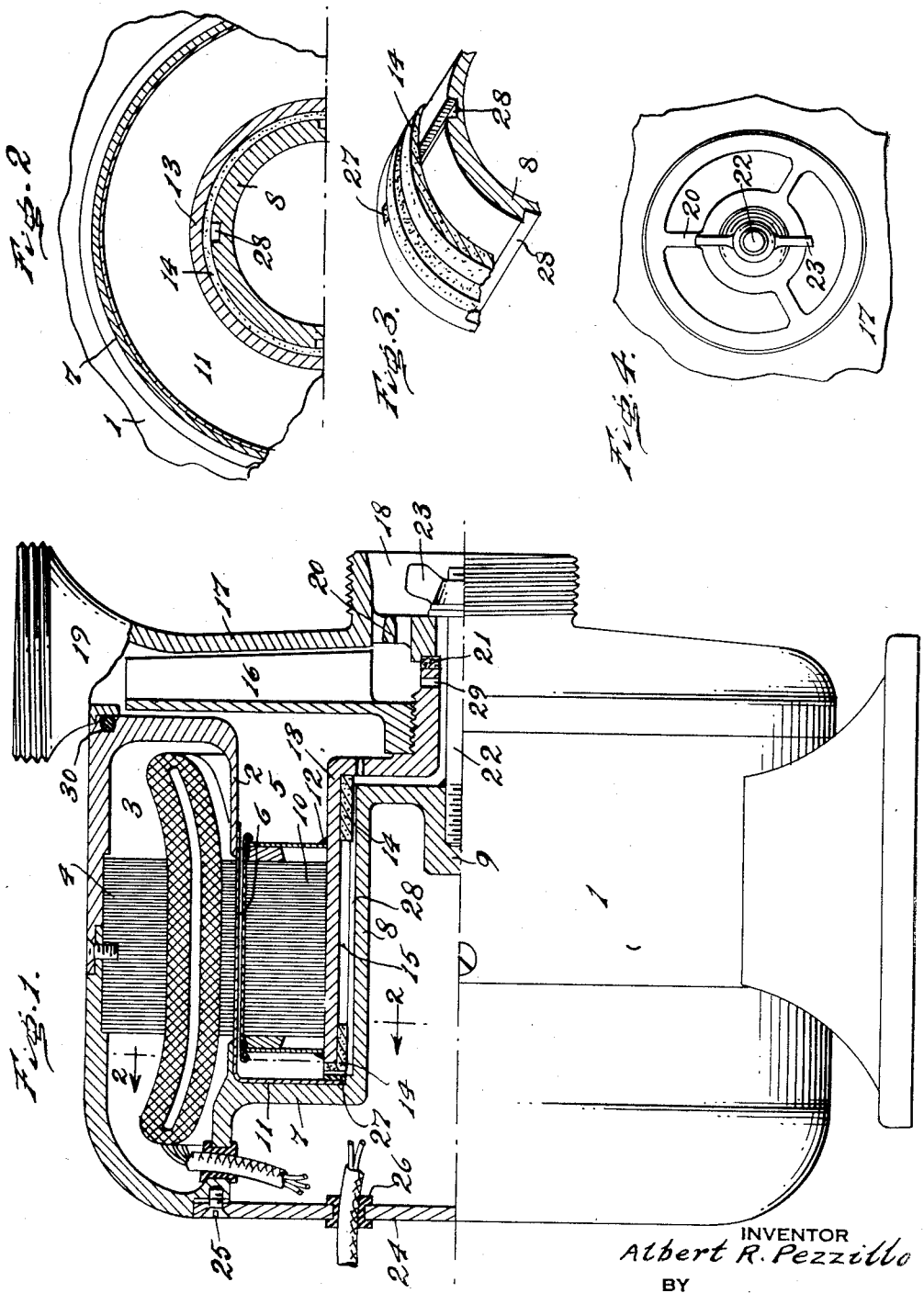
INVENTOR
Albert R. Pezzillo
BY
Herbert S. Fairbanks
ATTORNEY

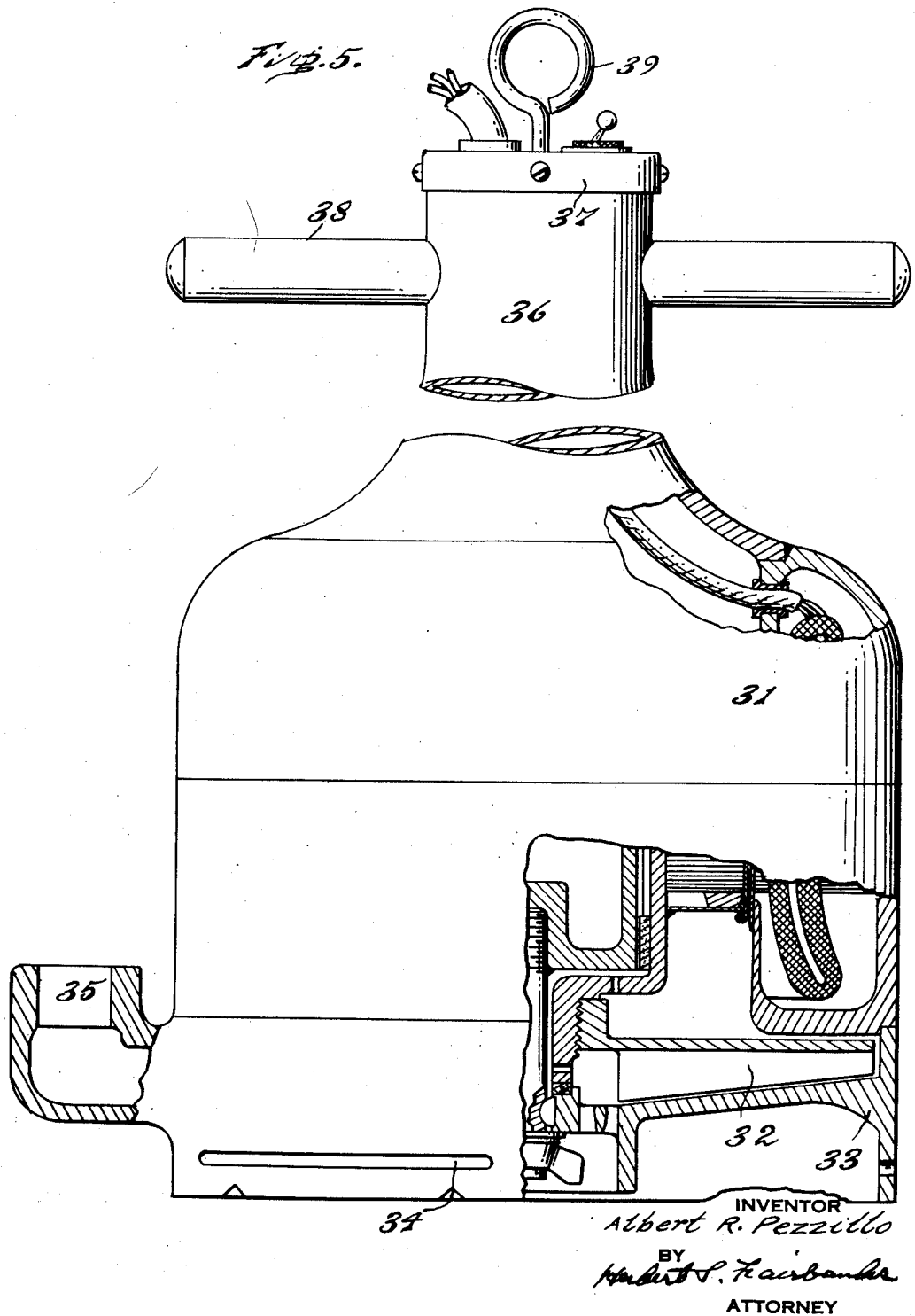

June 21, 1960
A. R. PEZZILLO
2,941,476
MOTOR PUMP UNITS
Filed June 23, 1955
5 Sheets-Sheet 3
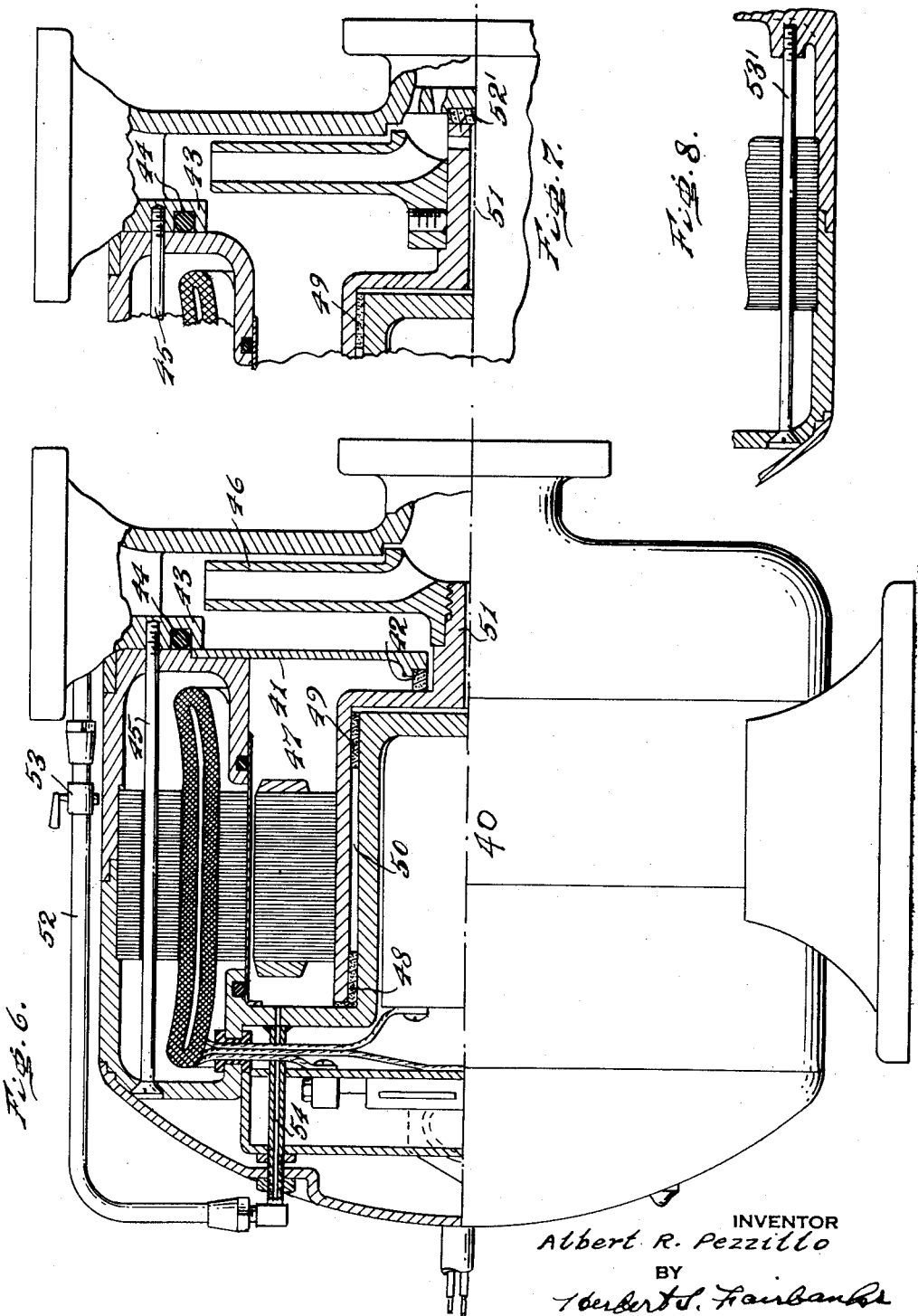
INVENTOR
Albert R. Pezzillo
BY
Herbert S. Fairbanks
ATTORNEY.

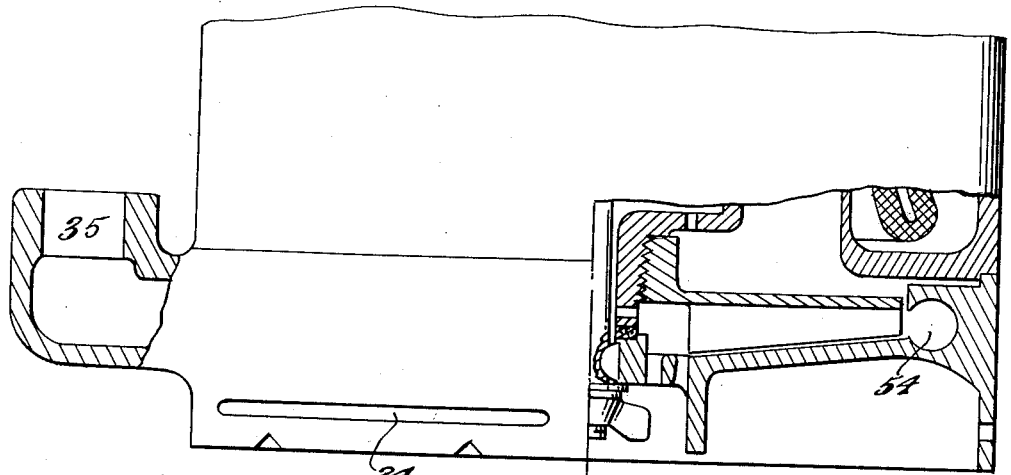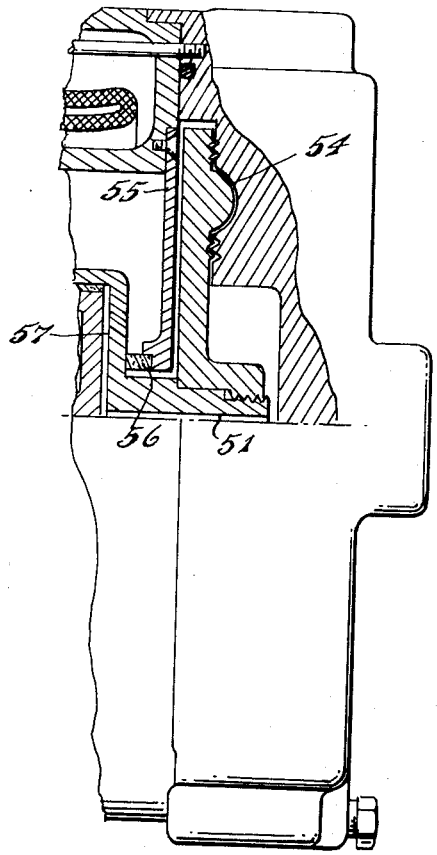

June 21, 1960

A. R. PEZZILLO 2,941,476

MOTOR PUMP UNITS

Filed June 23, 1955

INVENTOR
Albert R. Pezzillo
BY
Herbert S. Fairbanks
ATTORNEY

United States Patent Office 2,941,476
Patented June 21, 1960

2,941,476
MOTOR PUMP UNITS

Albert R. Pezzillo, Philadelphia, Pa., assignor, by mesne assignments, to Goulds Pumps, Inc., Seneca Falls, N.Y., a corporation of New York Filed June 23, 1955, Ser. No. 517,489

5 Claims. (Cl. 103—87)

The object of this invention is to devise a novel motor pump unit wherein the motor has its component parts of novel construction and arrangement to provide a standardized construction adapted to be combined with many different types of fluid impelling means.

A further object of the invention is to devise a novel motor pump unit wherein there is a continuous recirculation of fluid from the high pressure side of the pump through the rotor chamber and to the low pressure side at the pump inlet to carry away any excessive heat which may accumulate.

A further object of the invention is to devise a novel motor pump unit with a motor assembly of standardized construction and with a pump assembly which can be changed to operate as a centrifugal type, vane type, rotary type, or turbine type of pump.

A further object of the invention is to devise a novel motor pump unit which can be readily and quickly assembled or taken apart so that the moving parts can be cleaned and sterilized by submerging them in a cleaning and sterilizing solution.

A further object of the invention is to provide for feeding into the recirculating system, either with or without a separator, through an exterior pipe clear pump liquor.

A further object of the invention is to devise a novel motor pump unit which can be used for general pumping purposes, for food processing, and for pumping abrasives and chemicals.

With the foregoing and other objects in view as will hereinafter clearly appear, my invention comprehends a novel motor pump unit having a standardized motor construction capable of assembly with different types of fluid impelling pumps.

For the purpose of illustrating the invention, I have shown in the accompanying drawings preferred embodiments of it which, in practice, will give satisfactory and reliable results. It is, however, to be understood that the various instrumentalities of which the invention consists can be variously arranged and organized, and the invention is not limited, except by the scope of the appended claims, to the exact arrangement and organization of these instrumentalities as herein set forth.

Figure 1 is a side elevation, partly broken away, of a motor pump unit embodying my invention.

Figure 2 is a section on line 2—2 of Figure 1.

Figure 3 is an end view of the section of Figure 2, partly broken away.

Figure 4 is a perspective view showing a fragmentary section of a housing and circulating slot or passage.

Figure 5 is a side elevation, partly broken away of another embodiment of the invention when used as a sump pump.

Figure 6 is a side elevation, partly broken away, of a turbine arrangement.

Figure 7 is a perspective view of a portion of a turbine.

Figure 8 is a side elevation, partly broken away of a motor pump unit having a forced circulation.

Figure 9 is a sectional view showing a fastening arrangement.

Figure 10 is a side elevation, partly broken away, of a motor pump unit showing oil in the rotor chamber and vented to atmosphere.

Figure 11 is a side elevation, partly broken away, of a motor pump unit with the baffle omitted and a tripod for receiving thrust.

Similar numerals of reference indicate corresponding parts.

Figure 12:
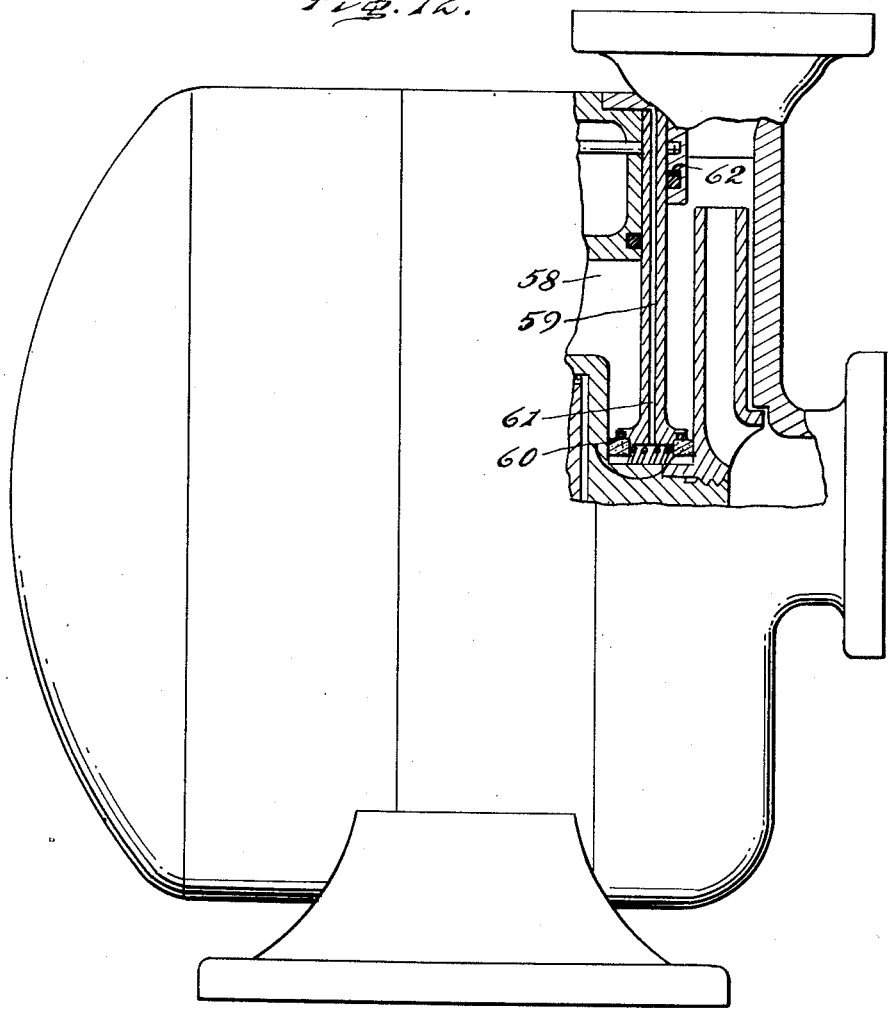
Figure 12 is a side elevation partly in section showing a modified form of sealing means.

Referring to the drawings:

Referring first to the embodiment shown in Figure 1, the motor pump unit has a sectional housing 1 with its sections connected in any desired manner. The housing has an inner separating wall 2 forming a stator chamber 3 within which a stator 4 is mounted and sealed from a rotor chamber 5 by a non-magnetic insulating ring 6 sealed with the wall 2 in any desired manner, for example by welding as shown. The wall 2 merges into a wall 7 which merges into a laterally extending wall 8 which terminates in a central hub 9. A rotor 10 is mounted in the rotor chamber 5 and if desired may be canned as shown at 11 with the ends welded in position as at 12. The annular wall 8 forms a bearing wall for the rotor. A carrier 13 for the rotor has bearings 14 pressed on to it, one of which is L shaped to take the trust, and the carrier has circumferentially spaced, longitudinally extending slots 15. The carrier is extended to form a hub portion on which an impeller 16 is fixed in any desired manner, for example by threading as shown.

An impeller housing 17 has a fluid inlet 18 and an outlet 19. Between the end of the hub of the rotor carrier and a tripod on the impeller housing as at 20 a carbon thrust ring is mounted as at 21. A stud 22 fixed to the hub 9 has a thumb nut 23 which bears against the tripod to secure the rotor assembly in position. An end closure 24 is secured to the motor housing by fastening devices 25 and has a seal 26 for the conductors of the motor. High pressure from the high pressure side of the impeller is free to pass into the rotor chamber 5 and therefrom by port 27 into passage 28 and port 29 to the low pressure side of the impeller at the inlet 18.

A sealing device 30 consisting of an annular groove and a sealing ring in the groove seals the impeller housing with the motor housing.

The embodiment seen in Figure 5, is especially adapted for the food processing industry where rigid sanitary regulations demand a construction that permits complete disassembly for thorough cleansing submerged in a caustic solution at high temperatures. The pumping unit is completely opened for inspection by removing the thumb nut and no tools are needed. In Figure 5, the motor pump unit is shown as a submersible unit. The motor assembly 31 is the same as that shown in Figure 1 but the impeller 32 is mounted in an impeller housing 33 having inlet ports 34 and outlet 35. The motor housing is extended upwardly in cylindrical form as at 36 and has mounted in it the conventional starting relay, overload protector and electrical connection box and the extension is closed by a cap 37. Handles 38 are provided for raising and lowering the unit and the cap carries a manual switch and a hook 39.

It is unnecessary to take apart the sump pump for cleaning since the unit can be placed in a caustic solution, the electric circuit closed, and the unit is self cleaning.

The embodiment seen in Figure 5 operates in so far as the motor and impelling unit is concerned the same as in Figure 1, with recirculation from the high pressure side through the rotor housing to the low pressure side.

Referring next to the embodiment seen in Figures 6, 7 and 8, I provide a forced circulation through the rotor chamber to the low pressure side of the pump. The unit 40 has a baffle 41 provided with a seal 42 and secured in position by a ring 43 having a seal 44 consisting of an annular groove and an O ring 53 are bolts securing together housing sections. In all of the embodiments of the invention, the sections of the motor housing and impeller housing are held together by bolts 45.

The circulation of high pressure from the impeller depending on the character of the seal 42 may pass into the rotor chamber 47 from impeller 46 or may be sealed therefrom, as desired. The fluid in the rotor chamber passes through bearings 48 and 49 and passages 50 and 51 to the low pressure side of the impeller. For forced circulation or other purposes, a pipe 52 having a valve 53 may be employed, the pipe being connected with a source of fluid pressure supply and discharging into the rotor chamber and therefrom through passages 50 and 51 to the low pressure side.

In Figure 7, the baffle 41 and seal 42 are omitted and the port 52' leads from passage 51 to the low pressure side. The sections of the motor housing are held together by bolts 45 in all cases.

In Figures 9, 10 and 11, I have shown how a turbine 54 can be employed with the passages 50 and 51 leading to the low pressure side.

In Figure 12, the motor and impeller assembly is the same as in the other figures except that the rotor chamber 58 is filled with oil and sealed by a baffle 59 and one of the sealing rings 60, the other preventing leakage from the impeller side. If any leakage should occur from either side it vents to atmosphere through vent passage 61. The outer end of the baffle is sealed with the housing by a seal 62.

The bearings between the rotor carrier and the cylindrical bearing may be pressed on or free floating. In Figures 1 and 5 they are preferably free floating for ease of disassembly of the component parts of the unit. The sleeve for insulating the stator chamber may be sealed in any desired manner, for example by welding or sealing rings to prevent impelled fluid entering the stator chamber and contacting with the stator windings.

Having thus described my invention, what I claim as new and desire to secure by Letters Patent is:

1. A combined motor and pump unit comprising, in combination, fixed motor casing means, a pump casing having a rotatable impeller mounted therein detachably secured to the motor casing means, said pump casing having a suction side and a pressure discharge side, a non-magnetic shield at least a part of which is cylindrical and sealed with respect to said motor casing means and forming an enclosure therewith, a stator mounted in said enclosure, a rotor support at least a part of which is cylindrical fixed to said motor casing means, a rotor carrier having a cylindrical part spaced from and in concentric relation to the rotor support, a rotor rigidly secured to said rotor carrier, a non-magnetic shield for said rotor at least part of which is cylindrical, said cylindrical part being in concentric relation to the cylindrical part of the rotor carrier and being spaced from and concentric with the cylindrical part of the stator shield, said rotor shield being sealed with respect to the rotor carrier, bearing means between said rotor carrier and said rotor support and means for circulating the fluid being pumped from the pressure discharge side of said pump casing through the annular space between said shields and through the space between said rotor carrier and rotor support occupied by said bearing means back to the suction side of the pump casing.

2. A combined motor and pump unit in accordance with claim 1 in which a flow channel exists between said rotor support and said rotor carrier for fluid passage.

3. A combined motor and pump unit in accordance with claim 1 in which a flow channel extends longitudinally of the unit between said rotor support and said rotor carrier for fluid passage, a hub for the reception of said impeller, means connecting said hub and said rotor carrier, a bore extending through said hub to the suction side of the pump casing and means for connecting said channel and said bore for the flow of fluid.

4. A combined motor and pump unit in accordance with claim 21 in which two bearings are provided and the bearings each have at least one groove formed therein for the passage of fluid.

5. A combined motor and pump unit in accordance with claim 21 in which a wall is provided between a part of the motor casing means and said rotor carrier, said wall defining with the pump casing a chamber in which the impeller operates and means enabling leakage of the fluid being pumped from the pressure side of said pump casing to the space between said shields.

References Cited in the file of this patent

UNITED STATES PATENTS

| | | |
|---|---|---|
| 611,719 | Tesla | Oct. 4, 1898 |
| 1,427,974 | Sessions | Sept. 5, 1922 |
| 2,120,914 | Vogel | June 14, 1938 |
| 2,261,915 | Korte | Nov. 4, 1941 |
| 2,301,063 | McConaghy | Nov. 3, 1942 |
| 2,406,947 | Harlamoff | Sept. 3, 1946 |
| 2,713,311 | White | July 19, 1955 |
| 2,741,990 | White | Apr. 17, 1956 |
| 2,830,541 | Higgins et al. | Apr. 15, 1958 |

FOREIGN PATENTS

| | | |
|---|---|---|
| 997,390 | France | Sept. 12, 1951 |